US011102151B1

(12) United States Patent
Reuss et al.

(10) Patent No.: US 11,102,151 B1
(45) Date of Patent: Aug. 24, 2021

(54) AUTOMATED CHAT AGENT FOR ABBREVIATION DEFINITIONS

(71) Applicant: Facebook, Inc., Menlo Park, CA (US)

(72) Inventors: Nathan L. Reuss, Half Moon Bay, CA (US); Carol Lynn Orsini, Valley Village, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/443,853

(22) Filed: Jun. 17, 2019

(51) Int. Cl.
*H04L 12/58* (2006.01)
*G06N 5/02* (2006.01)

(52) U.S. Cl.
CPC ............... *H04L 51/02* (2013.01); *G06N 5/02* (2013.01); *H04L 51/04* (2013.01); *H04L 51/16* (2013.01)

(58) Field of Classification Search
USPC ........................................................ 709/206
See application file for complete search history.

(56) References Cited

U.S. PATENT DOCUMENTS

| 2003/0139921 | A1* | 7/2003 | Byrd | G06F 40/289 |
| | | | | 704/10 |
| 2007/0143410 | A1* | 6/2007 | Kraft | G06Q 10/107 |
| | | | | 709/206 |
| 2009/0125477 | A1* | 5/2009 | Lu | G06F 16/3343 |
| 2012/0016678 | A1* | 1/2012 | Gruber | G06F 9/54 |
| | | | | 704/275 |
| 2016/0070792 | A1* | 3/2016 | Yuan | G06F 40/274 |
| | | | | 707/770 |

* cited by examiner

*Primary Examiner* — Hermon Asres
(74) *Attorney, Agent, or Firm* — Fenwick & West LLP

(57) ABSTRACT

A messaging server employs a chat agent for gather and transmitting abbreviations and definitions via a messaging application. In this application, abbreviations include acronyms, shortened phrases, and colloquial terms or language. Definitions describe an abbreviation and may include textual information and contextual media. The chat agent may receive an abbreviation and definition from a user or may automatically determine the abbreviation and definition from messages on the messaging application. The chat agent transmits the definition and abbreviation to an approval system, which verifies the definition. Once approved, the abbreviation database stores the abbreviation and definition. When another user requests the definition for an abbreviation, the chat agent queries abbreviation database and returns the definition in a message to the user via the messaging application. In some embodiments, the abbreviation database stores abbreviations and definitions in relation to group tags, which describe user groups within the messaging application.

20 Claims, 4 Drawing Sheets

AUTOMATED CHAT AGENT FOR ABBREVIATION DEFINITIONS

BACKGROUND

This disclosure relates generally to social networking system, and in particular to defining abbreviations within a conversation thread of a messaging application.

A messaging application allows users to communicate with each other in a conversation thread by sending content such as textual messages. These communications may be done between users for either business or social purposes. Such conversations may involve the inclusion of language and abbreviations, such as acronyms, used within the context of various groups, such as a business or social group.

SUMMARY

The above issue is addressed by an automated chat agent (herein referred to as a "chat agent" for simplicity) within a messaging server that provides definitions for abbreviations. The messaging interacts with client devices and an approval system to determine and transmit definitions with the chat agent.

The chat agent acts as an assistant tool within a messaging application to help users learn abbreviations and other languages, such as specific terms or acronyms (hence referred to together as "abbreviations" for simplicity). Abbreviations may be used to describe an action, feeling, activity, or place, and are commonly used between certain groups of people in specific social contexts. Some examples include "LOL" for "laugh out loud" or "MOMA" for "Museum of Modern Art." Users can add abbreviations and definitions, including both textual and media content, to an abbreviation database through the chat agent. In one embodiment, users send abbreviations and definitions in messages from the messaging application on client devices. Once the messaging server receives a new abbreviation and definition, the messaging server transmits the abbreviation and the definition to an approval system for approval. In some embodiments, the user who sent the abbreviations and the definition is also associated with a group tag that is also transmitted with the abbreviation and the definition so that the abbreviation and definition can be stored in relation to the group tag. Group tags indicate the social contest of an abbreviation, which may have different definitions based on the social context. When the chat agent provides definitions related to a group tag, the definitions are more relevant to the requesting user's social context. In further embodiments, the chat agent determines definitions from conversations between users via the messaging application by using character matching on text within the conversations.

The approval system may be moderated by human moderators within a community of users, sometimes associate with the group tag, or may automatically determine the validity of an abbreviation and definition. Once the abbreviation and the definition are approved, the messaging server adds the abbreviation and the definition to the abbreviation database. Otherwise, the messaging server does not add the abbreviation and definition to the abbreviation database. Due to the nature of adding abbreviation and definitions, the abbreviation database comprises community sourced information.

To request a definition for an abbreviation, a user of a messaging application accesses the chat agent like a contact within the messaging application. When a user sends a message with an abbreviation to the chat agent, indicating a request for the definition of the abbreviation, the messaging server queries the abbreviation database to determine the definition. In some embodiments, if multiple definitions exist for one abbreviation, the messaging server uses user information or associated group tags to determine the most suitable definition to return to a user. The messaging server then sends a message with the definition of the abbreviation back the user under the chat agent contact. In some embodiments, the chat agent automatically sends users definitions when an abbreviation appears in a conversation via the messaging application.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A messaging server employs a chat agent for learning and providing definitions for abbreviations or other terms occurring in text communications via a messaging application. Abbreviations include acronyms, shortened phrases, and colloquial terms or language, and definitions define abbreviations using textual information and contextual media content. In one embodiment, the chat agent receives definitions from users, which are used to populate an abbreviation database. Alternatively, the chat agent determines definitions for abbreviations automatically from the context and content of conversations between users of the messaging application. An approval system assesses the validity of the abbreviation and definition, either automatically or through an administrative moderator. The acronym database stores abbreviations in association with definitions. In some embodiments, multiple definitions exist for each abbreviation. The definitions may be categorized by group tags associated with the users that provided the definitions or by other user information gathered by the messaging application or obtained from a connected social networking system. A user may request a definition for an abbreviation from the chat agent using the messaging application, and the chat agent queries the abbreviation database to determine a definition. In embodiments where more than one definition exists, the chat agent may select a definition based on the group tag of the user or user information or the chat agent may select more than one definition. The chat agent then sends the definition to the user via a chat in the messaging application.

System Architecture

Figure 1:
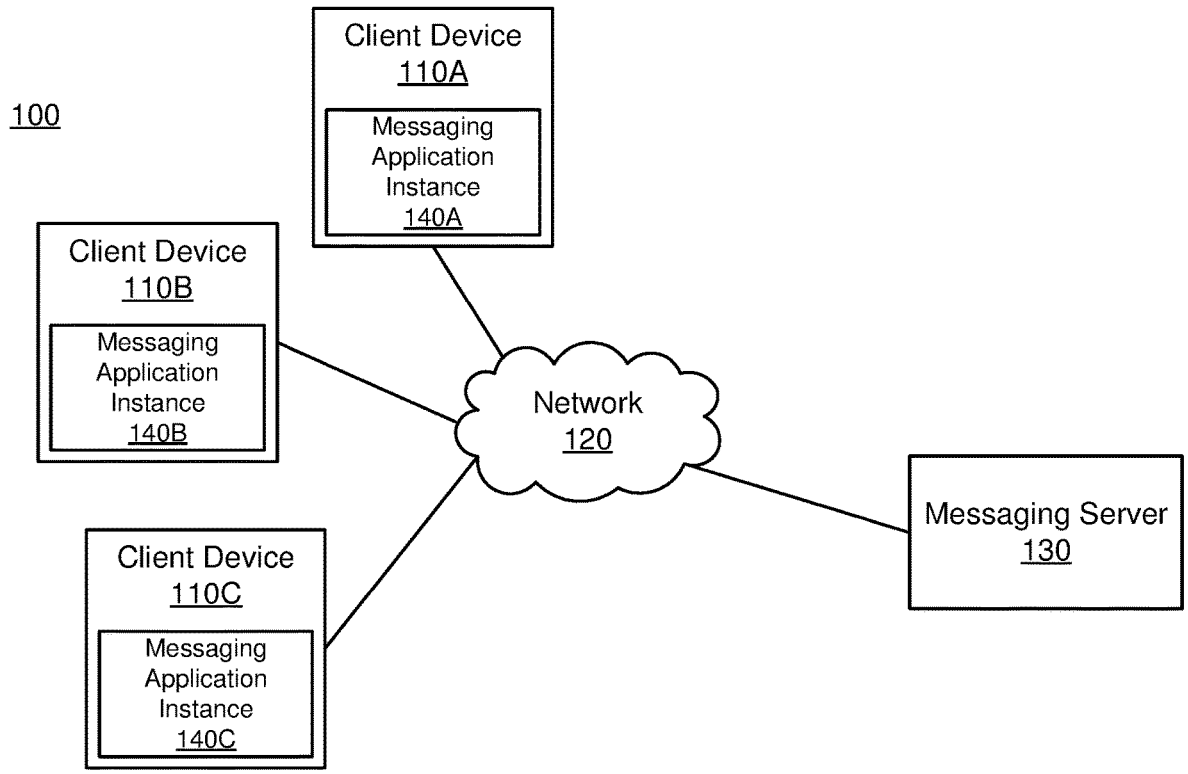
FIG. 1 is a block diagram of a system environment in which an online system operates, in accordance with an embodiment.

FIG. 1 is a block diagram of a system environment 100 for a messaging server 130. The system environment 100 shown by FIG. 1 comprises one or more client devices 110, a network 120, and the messaging server 130. Users of the client devices 110 use a messaging application, instances 140 of which respectively execute on the client devices 110, to establish a conversation thread to communicate with one another. In alternative configurations, different and/or additional components may be included in the system environment 100. For example, in some embodiments, the messaging server 130 is a component of a social networking system, a content sharing network, or another system providing content to users. These various components are now described in additional detail.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a mobile telephone, a smartphone, a smart watch, or another suitable device. A client device 110 is configured to communicate via the network 120. In one embodiment, a client device 110 executes a messaging application allowing a user of the client device 110 to interact with the messaging server 130. For example, a client device 110 executes the messaging application to enable interaction between the client device 110 and the messaging server 130 via the network 120. In another embodiment, the messaging application is a web application that is accessible via a browser. In a further embodiment, a client device 110 interacts with the messaging server 130 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The message application instances 140 facilitate text-based chat messages between two or more client devices 110. The messages may include natural language text and/or media content inputted by users of the respective client devices 110 to facilitate a conversation thread between the users. The messaging application instances 140 may track multiple conversation threads, each of which has a set of participant users that are communicating via that thread. For example, the user of the client device 110A might be using instance 140A of the messaging application to communicate on a first thread with a coworker about their current project, and on a second thread with two friends about where to have dinner. The conversation threads within the messaging application instances 140 may contain different types of content, such as text and media items.

Figure 2:
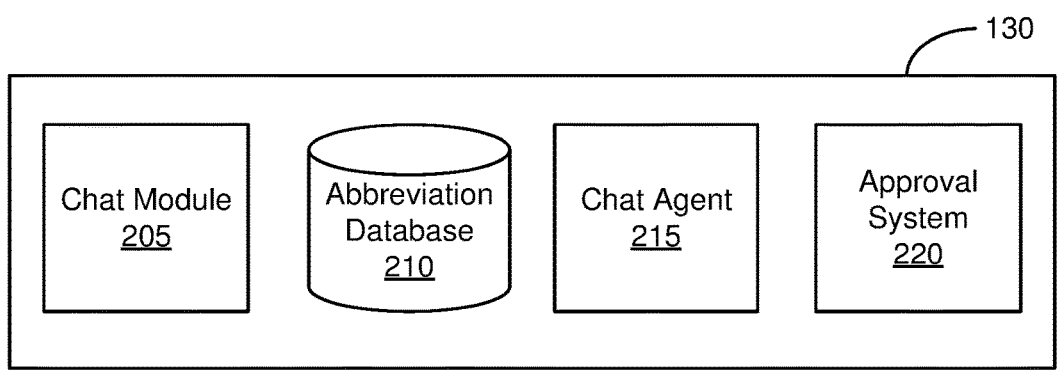
FIG. 2 is a block diagram of a messaging server, in accordance with an embodiment.

FIG. 2 is a block diagram of an architecture of the messaging server 130. The messaging server 130 shown in FIG. 2 includes a chat module 205, an abbreviation database 210, a chat agent 215, and an approval system 220. In other embodiments, the messaging server 130 may include additional, fewer, or different components for various applications. In addition, the functionality attributed to specific modules herein may be performed by other modules in other embodiments.

The chat module 205 receives, stores, and sends chats between client devices 110 executing the messaging application. In one embodiment, a first user instructs a client device 110A to send a message via a message application instance 140A to the messaging server 130. The chat module 205 receives the message and stores the message in relation to the first user and a second user the first user directed the message to. The chat module 205 then sends the message to the messaging application instance 140B on the client device 110B of the second user. In other embodiments, the message may be sent between multiple client devices 110 for multiple users in a group chat, and the chat module 205 stores messages from the group chat in relation to the multiple users in the group chat. Messages directed to the chat agent 215 instead of another client device 110A or client devices 110 bypass the chat module 205 and are received directly by the chat agent 215, further described below.

The chat module 205 also stores information about each user of the messaging application. In addition to storing messages between users of client devices 110 and in group chats, the chat module 205 stores group tags associated with each user. Group tags may indicate a work group, social group, educational group, or any other grouping of users. For example, the chat module 205 would store users with messaging application accounts linked to their workplace to a group tag indicating their workplace (i.e. "Paradise Ice Cream" or "Logic Enterprises"). The chat module 205 may store other information related to a user's messaging application account in relation to the user. In embodiments where the messaging server 130 is part of a social networking system, the chat module 205 may access user information from the social networking system describing users' interactions with each other, users' actions within the social networking system, users' affinity for certain content items, user's affinity for other users, and users' relationship to other users and content items. In some embodiments, the chat module 205 also parses the messages associated with each user to determine implicit user information from the messages. For example, the chat module 205 may determine that one user likes dogs because the user has sent 100 dog videos to other users via the messaging application on a client device 110A.

The abbreviation database 210 stores abbreviations in association with definitions. In this application, abbreviations include acronyms, shortened phrases, and colloquial language and terms. Definitions describe an abbreviation and may include textual descriptions and/or contextual media. For example, the definitions for "LOL" might be "laugh out loud—commonly used to express amusement in an electronic or textual message" or include a picture of someone laughing. The abbreviation database 210 may store abbreviations and definitions in an index or in a multitude of arrays. In addition, the abbreviation database 210 may store more than one definition for each abbreviation, according to come embodiments. For example, when an abbreviation already exists within the abbreviation database 210, only the definition is added in relation to the abbreviation instead of a new entry being made in the database for both the abbreviation and the definition. In some embodiments, the abbreviation database 210 stores each definition for an abbreviation with the group tag associated with the user that sent the abbreviation to the chat agent 210. In other embodiments, the abbreviation database 210 stores the definition for an abbreviation in association with the user that sent the abbreviation to the chat agent 215.

The chat agent 215 is an automated artificially intelligent agent that can conduct a conversation via the messaging application using natural language. From the perspective of a user of the messaging application, the chat agent 215 simulates a conversation with another individual such that the conversation appears natural instead of artificially created. The chat agent 215 appears as a contact in the messaging application that the user can access, similar to how other users appear. The user can choose the contact for the chat agent 215 to start a conversation with the chat agent 215 to add a definition to the abbreviation database 210 or request a definition from the abbreviation database 210.

The chat agent 215 sends and receives abbreviations and definitions. The chat agent 215 receives messages from users of the messaging application via the client devices 110 directed to the chat agent 215 instead of other users. The chat agent 215 receives an request for a definition of an abbreviation from a querying user for the definition of the abbreviation. In some embodiments, the user selects an interface button on the messaging application display and enters the abbreviation to request the definition. In other embodiments, the user requests the definition via a natural language request in a conversation with the chat agent 215. In further embodiments, the user enters an abbreviation in the conversation with the chat agent 215 and the request for the definition is implicit to the chat agent 215 upon receiving the abbreviation. Once the chat agent 215 has received the request, the chat agent 215 queries the abbreviation database 220 to determine the appropriate definition for the abbreviation. If the abbreviation database 210 only contains one definition for the abbreviation, the chat agent 215 sends the definition to querying user. In some embodiments, the chat agent 215 determines the group tag of the querying user and sends a definition for abbreviation associated with the group tag to the querying user. In other embodiments, the chat agent 215 accesses user information from the chat module 205 to determine which definition to send. For example, the chat agent 215 may send a definition stored with in relation to a user with a high affinity score to the querying user over a definition stored in relation to another user with a low affinity score. Further, the chat agent 215 may send all or multiple definitions stored for an abbreviation to a user, according to embodiments. If an abbreviation or definition does not exist, the chat agent 215 may return an error message or a link to information from an external search engine defining the abbreviation.

In some embodiments, the chat agent 215 may receive input from users about definition options. The definition options allow a user to specify what types of definitions and which definitions they receive from the chat agent 215 when an abbreviation is associated with more than one definition in the abbreviation database 210. In one such embodiment, the chat agent 215 receives information from users about definitions that may be used to rank the definitions for further use. For example, the chat agent 215 may request the user to rate the usefulness of a definition from 1 to 5. The abbreviation database 210 stores an average value of the ratings for each definition and, when queried, send the definition with the highest rating to the chat agent 215. In another embodiment, the chat agent 215 receives input from users indicating their definition preferences. For example, a user may select a number of group tag options, rating levels, or definition content types (i.e., a user may prefer contextual media to always be included in a definition from the chat agent 215).

The chat agent 215 also receives abbreviations and definitions from users to add to the abbreviation database. When a user sends a message with an abbreviation and a definition to the chat agent 215, the chat agent 215 sends the abbreviation and definition to the approval system 220 for approval. In some embodiments, the user indicates a desire to add a definition for an abbreviation on their messaging application instance 140A. In some embodiments, the user may do so by interacting with a button or icon on a user interface for the messaging application. For example, once the user interacts with the button, the chat agent 215 provides the user with a form in the messaging application to enter a new abbreviation and definition, including media items, and any other information feels is relevant to the definition, such as an explanation for the approval system or a group tag. In other embodiments, the user includes a new abbreviation and definition in a message to the chat agent 215. The chat agent 215 parses the natural language of the message to look for keywords that indicate the user's desire to add a definition, such as "add" or "update," followed by the abbreviation. In further embodiments, the chat agent other artificial intelligence methods to understand the user's request in a message.

The chat agent 215 may instruct a user on how to add or request a definition. In some embodiments, when a user interacts with a new user button on the user interface of the messaging application, the chat agent sends a message to the user explaining how to add or request a definition. The chat agent 215 may instruct the user via a textual message or through visual media content, such as a video. In some embodiments, the instructions include examples of samples ways to use the chat agent 215. The chat agent 215 may also offer settings for the user to input, such as whether the chat agent 215 can access the user's conversations with other users. In further embodiments, the user may input more than one definition for an abbreviation.

The chat agent 215 may also automatically determine definitions based on context from messages stored in the chat module 205 if allowed by privacy settings specified by a user. To protect user privacy, privacy settings may allow the user to specify (e.g., by opting out, by not opting in) whether the messaging server 130 may receive, collect, log, or store particular objects or information associated with the user for any purpose. In some embodiments, messaging server 130 does not perform any monitoring of the user's information unless the user expressly opts in. In other embodiments, the user may specify in the privacy settings that they would like to give permission to the chat agent 215 to access messages from the chat module 205. In another embodiment, the user may opt into a pre-determined group associated with a group tag and give the chat agent 215 permission to monitor conversations between the user and other users in the pre-determined group who have also opted in. Using the conversations, the chat agent 215 maps characters to determine definitions for detected abbreviations.

In some embodiments, the chat module 205 detects, in real-time, messages between users of in a pre-determined group that contain abbreviations and sends the messages to the chat agent 215. In some embodiments, users opt in to allowing the messaging server to monitor their messages for abbreviations. The chat agent 215 queries the abbreviation database 210 for a definition and sends a message with a definition for the abbreviation to the user receiving the message with the abbreviation. In this way, the chat agent 215 "comes alive" when users' conversations via the messaging application contain an abbreviation. In some embodiments, the chat agent records the number of times the abbreviation has appeared in a message to a user and does not send a definition for the abbreviation once the acronym has appeared more than a threshold amount.

The approval system 220 receives definitions for addition to the abbreviation database 210 from the chat agent 215 and determines the validity of the definitions. Upon receiving an abbreviation and definition from the user, the chat agent 215 sends the abbreviation and definition to the approval system 220. The approval system 220 determines if the definition is valid for the abbreviation, and if so, approves the abbreviation and definition for entry into the abbreviation database 210. Otherwise, the abbreviation and definition are not added to the abbreviation database 210. In some embodiments, the approval system 220 sends a message to an administrator account (e.g., via the messaging application, email, or other protocol) to enable the administrator to manually review and approve the abbreviation and definition. Once the abbreviation and definition are approved, the approval system 220 sends the abbreviation and the definition to the abbreviation database 210 for storage. In further embodiments, users associated with a group tag for the abbreviation and definition provide moderation of the abbreviations for the group tag. For example, when a new abbreviation and definition are provided to the approval system 220, the approval system 220 may message each user associated with the group tag to vote on the approval of the abbreviation and definitions.

In other embodiments, the approval system 220 automatically determines the validity of an abbreviation and definition using artificial intelligence. For example, the approval system 220 may query the abbreviation database 210 for the abbreviation to compare the definition to other definitions stored for that abbreviation under various group tags. In some embodiments, the approval system 220 also queries a separate library of terms or a web-based search system to compare the definition for the abbreviation against other definitions or information for the abbreviation. In further embodiments, the approval system sends a message via the chat agent 215 asking the user if the abbreviation matches any of the other definitions. The user may choose a definition from the other definitions, which the approval system may use to build a database mapping definitions to one another and improve the validity of definitions approved by the approval system 220.

The approval system 220 allows users to determine the accuracy of definitions through a consensus-based approach. Generally, when the abbreviation database 210 only stores one definition per abbreviation, the definitions evolve over time as users update the definitions via the chat agent 215. As more users enter an abbreviation to the chat agent 215, the abbreviation is weighted to give it more creditability as an abbreviation in comparison to other abbreviations. However, in some embodiments, the approval system 220 furthers this consensus-based approach by taking user input for the validity of definitions. For example, the abbreviation database 210 may track users in association with the definitions they added. The approval system 220 may access this information from the abbreviation database 210 and use machine learning to blacklist users whose definitions are frequently changed by other users. In addition, the approval system may give priority to definitions from users whose definitions are rarely overwritten and streamline the approval for definitions from those users. These users may span different pre-determined groups related to group tags and have more administrative power than other users of the pre-determined group.

Transmitting Abbreviation Definitions

Figure 3:
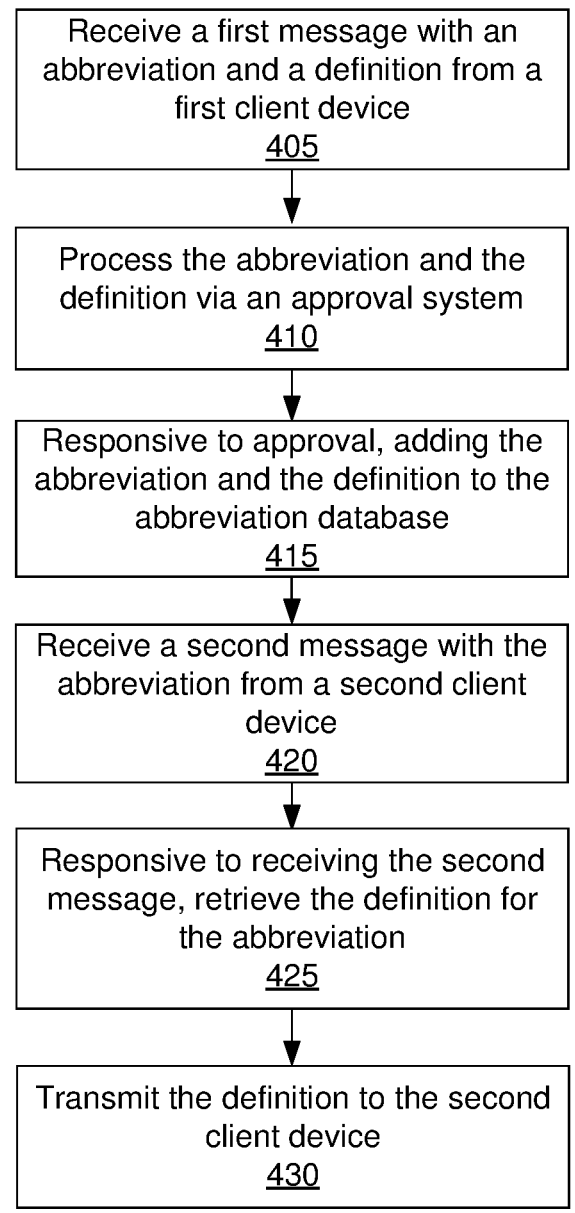
FIG. 3 is a flowchart illustrating a method of transmitting a definition of an abbreviation to a client device, in accordance with an embodiment.

FIG. 3 is a flowchart illustrating a method of transmitting a definition of an abbreviation to a client device, according to one embodiment. The messaging server 130 receives a first message with an abbreviation and a definition for the abbreviation from a first messaging application instance 140A from a first client device 110A. The first message is directed to the chat agent 215 of the messaging server. In some embodiments, the messaging server 130 may parse a message containing extraneous information to extract the abbreviation and definition.

The messaging server processes the abbreviation and the definition parsed from the message via an approval system. In some embodiments, messaging server sends a message, such as an email or a text message, to a moderator who determines the validity of the definition. The moderator may be one person who makes the decision individually or a group of people who vote on inclusion of the abbreviation and the definition in the abbreviation database 210. In other embodiments, the approval system 220 uses natural language processing and a web processor to compare the abbreviation to implicit definitions from previous messages on the messaging server, definitions from external websites, and content from a social networking system.

Responsive to the abbreviation and definition being approved, the messaging server 130 adds the abbreviation and the definition to the abbreviation database 210. In some embodiments, the messaging server 130 stores the abbreviation and definition in relation with a group tag identifying a group of the user from the first client device. The messaging server 130 may store multiple group tags with the abbreviation and the definition if the user is associated with multiple groups. In other embodiments, the messaging server may request, via the chat agent 215, a group tag from a user associated with the first client device. The messaging server 130 may store multiple definitions in association with each abbreviation. In some embodiments, different definitions for the same abbreviation may be stored with different group tags.

The messaging server 130 receives a second message with the abbreviation from a second client device. In some embodiments, the second message is a query directed to the chat agent 215. Responsive to receiving the second message, the messaging server 130 retrieves the definition for the abbreviation. In some embodiments, the messaging server 130 determines a group tag associated with a user of the second client device to determine which definition to retrieve of a plurality of definitions stored for an abbreviation. Further, the messaging server 130 may request a group tag from the user of the second client device via the chat agent 215. In other embodiments, the messaging server 130 access user information from the chat module 205 to determine which definition to choose. Once the messaging server 130 has chosen a definition, the messaging server 130 transmits the definition to the second client device 110B via the chat agent 215 to a second messaging application instance 140B.

It is appreciated that although FIG. 2 illustrates a number of interactions according to one embodiment, the precise interactions and/or order of interactions may vary in different embodiments. For example, in some embodiments, the messaging server 130 skips obtaining approval for the abbreviation and definition and adds the abbreviation and definition to the abbreviation database 210 after receiving the first message.

Figure 4:
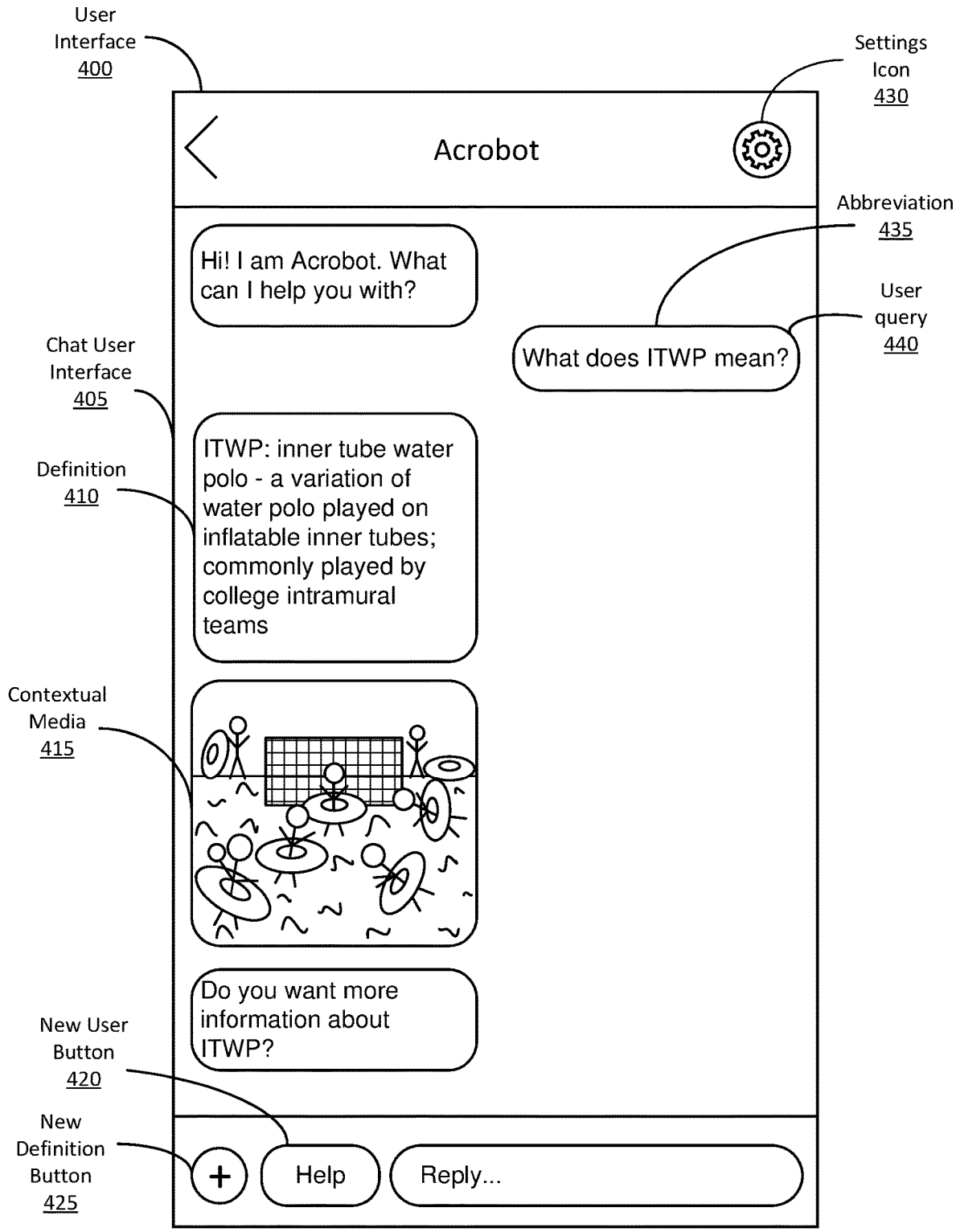
FIG. 4 is an example of user interface showing a chat agent, according to one embodiment.

FIG. 4 is an example of user interface 400 showing a chat agent, according to one embodiment. The user interface 400 includes a chat user interface 405, a new user button 420, a new definition button 425, and a settings icon 430.

The chat user interface 405 depicts a user query 440 requesting the meaning of the abbreviation 440 "ITWP." The chat agent 215 "Acrobot" sent a message to the user with a definition 410 of the abbreviation 435, as well contextual media 415 depicting a game of ITWP. The chat agent also asks the user if they would like more information about the abbreviation 435. If the user responds affirmatively, the chat agent 215 may send the user more definitions from the abbreviation database 210 or may determine a link to more information on a website about the abbreviation 435.

A user may use other elements of the user interface 400 to interact with the chat agent 215. When the user clicks on the new user button 420, the chat agent 215 may send a message describing how to interact with the chat agent 215. For example, the chat agent 215 may send a message explaining how to request a definition and how add a definition to the abbreviation database 220 using elements of the user interface 400. The user can add a new definition to the abbreviation database 220 by clicking on the new definition button and entering the abbreviation, definition, and any other requested information. The user can also edit the settings associated with the chat agent 215 by cocking on the settings icon 430. For example, the user can set how many definitions per user query 440 they would like to receive or if the chat agent 215 may come alive to define abbreviations in other messaging application conversations. In other embodiments, the user interface 400 includes an element a user can interact with to share an acronym and the definition with other users of the messaging application, associated with a specific group tag, or part of a social networking system. The user may send the acronym and the definition to the other users via a message through the messaging application or a post on a social networking system.

Figure 5:
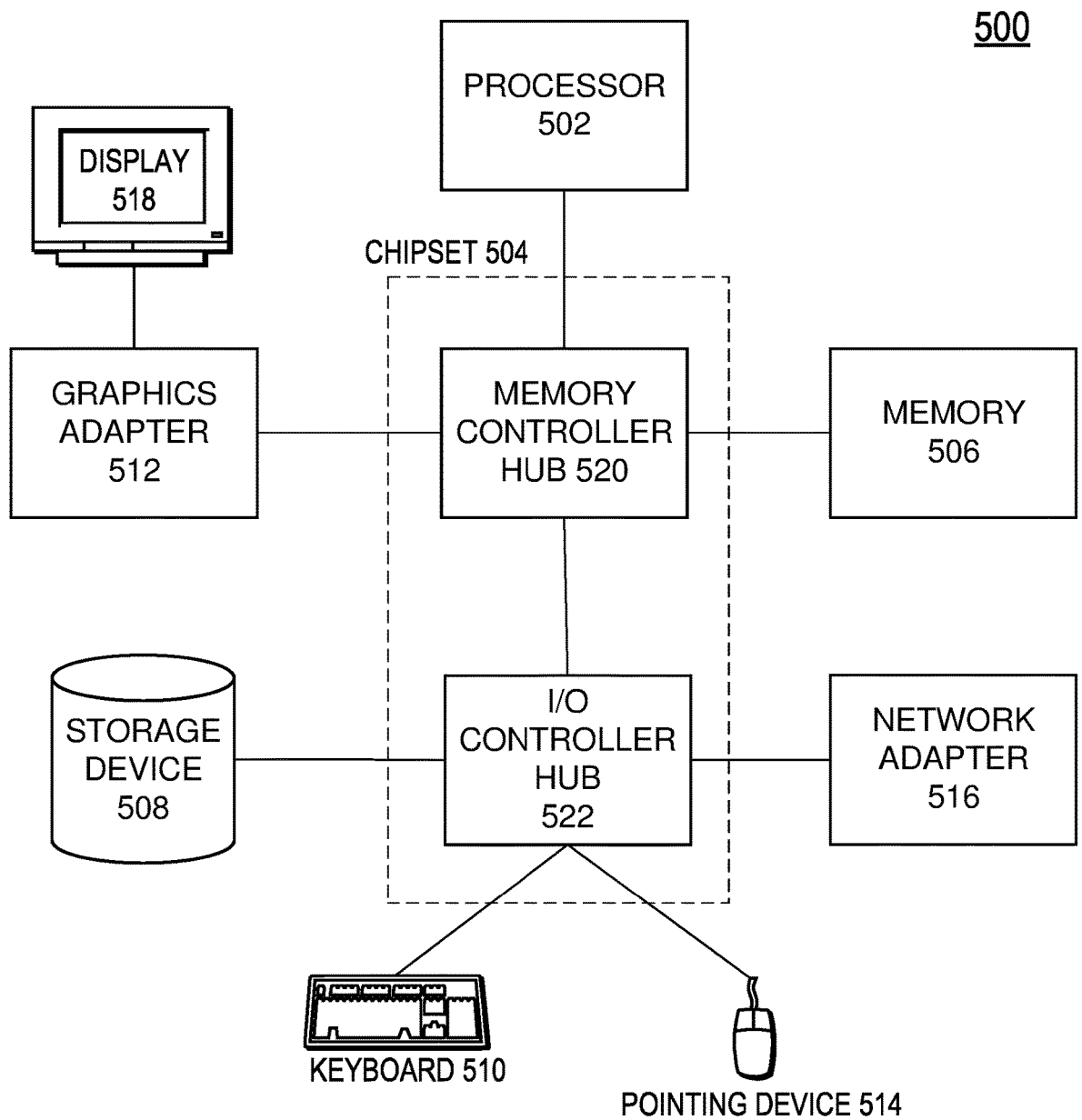
FIG. 5 is a high-level block diagram illustrating physical components of a computer used as part or all of a client device from FIG. 1, in accordance with an embodiment.

FIG. 5 is a high-level block diagram illustrating physical components of a computer used as part or all of the client device 110 from FIG. 1, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a graphics adapter 512, and/or display 518, as well as a keyboard or pointing device. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, by an automated chat agent, a first message from a first user at a first client device via a messaging application, the first message including a request to add an abbreviation and a definition to an abbreviation database;
   transmitting the abbreviation and the definition to an approval system configured to approve or deny the request;
   receiving an approval of the abbreviation and the definition from the approval system, wherein the received approval is for entry of the abbreviation and the definition into the abbreviation database, and wherein the received approval is based on tracked information associated with the first user requesting addition of the abbreviation and the definition;
   responsive to receiving the approval from the approval system, adding the abbreviation and the definition to the abbreviation database, the abbreviation database containing abbreviations with definitions for a community of users;
   receiving, by the automated chat agent, a second message from a second client device via the messaging application, the second message including a natural language message including the abbreviation;
   responsive to receiving the second message, retrieving the definition for the abbreviation from the abbreviation database; and
   generating a natural language response to the second message providing the definition associated with the abbreviation; and
   transmitting the natural language response via the automated chat agent to the messaging application of the second client device.

2. The method of claim 1, further comprising:
   receiving, by the automated chat agent, a third message from a third client device via a messaging application, the third message including the abbreviation and a second definition;
   transmitting the abbreviation and the second definition to the approval system; and
   responsive to the approval system approving the abbreviation and the second definition, updating the abbreviation database with the second definition for the abbreviation.

3. The method of claim 1, further comprising:
   determining a group tag associated with the first user of the messaging application of the first client device; and
   storing, in the abbreviation database, the abbreviation and the definition in association with the group tag.

4. The method of claim 3, further comprising:
   receiving, by the automated chat agent, a third message from a third client device via the messaging application, the third message including the abbreviation and a second definition, wherein the messaging application of the third client device is associated with a third user and the third user is associated with the group tag;
   transmitting the abbreviation and the second definition to the approval system; and
   responsive to the approval system approving the abbreviation and the second definition, updating the abbreviation database with the second definition for the abbreviation and the group tag.

5. The method of claim 3, further comprising:
   receiving, by the automated chat agent, a third message from a third client device via a messaging application, the third message including the abbreviation and a second definition, wherein the messaging application of the third client device is associated with a third user and the third user is associated with a second group tag different than the first group tag;
   transmitting the abbreviation and the second definition to the approval system; and
   responsive to the approval system approving the abbreviation and the second definition, adding the second definition to the acronym database for the abbreviation in association with the second group tag.

6. The method of claim 1, wherein the definition includes a textual definition and contextual media items.

7. The method of claim 1, wherein the approval system uses artificial intelligence for automated approval of abbreviations and definitions.

8. The method of claim 1, wherein the first message including an abbreviation and a definition is generated via an automated system, the automated system configured to parse a plurality of messages from the messaging application and matches characters of the messages to identify abbreviations and definitions.

9. A non-transitory computer-readable storage medium comprising instructions executable by a processor, the instructions comprising:
   instructions for receiving, by an automated chat agent, a first message from a first user at a first client device via a messaging application, the first message including a request to add an abbreviation and a definition to an abbreviation database;
   instructions for transmitting the abbreviation and the definition to an approval system configured to approve or deny the request;
   instructions for receiving an approval of the abbreviation and the definition from the approval system, wherein the received approval is for entry of the abbreviation and the definition into the abbreviation database, and wherein the received approval is based on tracked information associated with the first user requesting addition of the abbreviation and the definition;
   instructions for adding the abbreviation and the definition to the abbreviation database responsive to receiving the approval from the approval system, the abbreviation database containing abbreviations with definitions for a community of users;
  instructions for receiving, by the automated chat agent, a second message from a second client device via the messaging application, the second message including a natural language message including the abbreviation;
  instructions for retrieving the definition for the abbreviation from the abbreviation database responsive to receiving the second message; and
  instructions for generating a natural language response to the second message providing the definition associated with the abbreviation; and
  instructions for transmitting the natural language response via the automated chat agent to the messaging application of the second client device.

10. The non-transitory computer-readable storage medium of claim 9, the instructions further comprising:
  instructions for receiving, by the automated chat agent, a third message from a third client device via a messaging application, the third message including the abbreviation and a second definition;
  instructions for transmitting the abbreviation and the second definition to the approval system; and
  responsive to the approval system approving the abbreviation and the second definition, instructions for updating the abbreviation database with the second definition for the abbreviation.

11. The non-transitory computer-readable storage medium of claim 9, the instructions further comprising:
  instructions for determining a group tag associated with the first user of the messaging application of the first client device; and
  instructions for storing, in the abbreviation database, the abbreviation and the definition in association with the group tag.

12. The non-transitory computer-readable storage medium of claim 11, the instructions further comprising:
  instructions for receiving, by the automated chat agent, a third message from a third client device via the messaging application, the third message including the abbreviation and a second definition, wherein the messaging application of the third client device is associated with a third user and the third user is associated with the group tag;
  instructions for transmitting the abbreviation and the second definition to the approval system; and
  responsive to the approval system approving the abbreviation and the second definition, instructions for updating the abbreviation database with the second definition for the abbreviation and the group tag.

13. The non-transitory computer-readable storage medium of claim 11, the instructions further comprising:
  instructions for receiving, by the automated chat agent, a third message from a third client device via a messaging application, the third message including the abbreviation and a second definition, wherein the messaging application of the third client device is associated with a third user and the third user is associated with a second group tag different than the first group tag;
  instructions for transmitting the abbreviation and the second definition to the approval system; and
  responsive to the approval system approving the abbreviation and the second definition, instructions for adding the second definition to the abbreviation database for the abbreviation in association with the second group tag.

14. The non-transitory computer-readable storage medium of claim 9, wherein the definition includes a textual definition and contextual media items.

15. A computer system comprising:
  a computer processor; and
  a non-transitory computer-readable storage medium storage instructions that when executed by the computer processor perform actions comprising:
    receiving, by an automated chat agent, a first message from a first user at a first client device via a messaging application, the first message including a request to add an abbreviation and a definition to an abbreviation database;
    transmitting the abbreviation and the definition to an approval system configured to approve or deny the request;
    receiving an approval of the abbreviation and the definition from the approval system, wherein the received approval is for entry of the abbreviation and the definition into the abbreviation database, and wherein the received approval is based on tracked information associated with the first user requesting addition of the abbreviation and the definition;
    responsive to receiving the approval from the approval system, adding the abbreviation and the definition to the abbreviation database, the abbreviation database containing abbreviations with definitions for a community of users;
    receiving, by the automated chat agent, a second message from a second client device via the messaging application, the second message including a natural language message including the abbreviation;
    responsive to receiving the second message, retrieving the definition for the abbreviation from the abbreviation database; and
    generating a natural language response to the second message providing the definition associated with the abbreviation; and
    transmitting the natural language response via the automated chat agent to the messaging application of the second client device.

16. The computer system of claim 15, the actions further comprising:
  receiving, by the automated chat agent, a third message from a third client device via a messaging application, the third message including the abbreviation and a second definition;
  transmitting the abbreviation and the second definition to the approval system; and
  responsive to the approval system approving the abbreviation and the second definition, updating the abbreviation database with the second definition for the abbreviation.

17. The computer system of claim 15, the actions further comprising:
  determining a group tag associated with the first user of the messaging application of the first client device; and
  storing, in the acronym database, the abbreviation and the definition in association with the group tag.

18. The computer system of claim 17, the actions further comprising:
  receiving, by the automated chat agent, a third message from a third client device via the messaging application, the third message including the abbreviation and a second definition, wherein the messaging application of the third client device is associated with a third user and the third user is associated with the group tag;

transmitting the abbreviation and the second definition to the approval system; and responsive to the approval system approving the abbreviation and the second definition, updating the abbreviation database with the second definition for the abbreviation and the group tag.

19. The computer system of claim 17, the actions further comprising:

receiving, by the automated chat agent, a third message from a third client device via a messaging application, the third message including the abbreviation and a second definition, wherein the messaging application of the third client device is associated with a third user and the third user is associated with a second group tag different than the first group tag;

transmitting the abbreviation and the second definition to the approval system; and responsive to the approval system approving the abbreviation and the second definition, adding the second definition to the abbreviation database for the abbreviation in association with the second group tag.

20. The computer system of claim 15, wherein the definition includes a textual definition and contextual media items.

* * * * *